Nov. 5, 1963   J. V. OLIVEAU   3,109,457
GATE VALVE
Filed Sept. 25, 1959   3 Sheets-Sheet 1

INVENTOR.
JOHN V. OLIVEAU
BY
Benj. T. Rauber
ATTORNEY

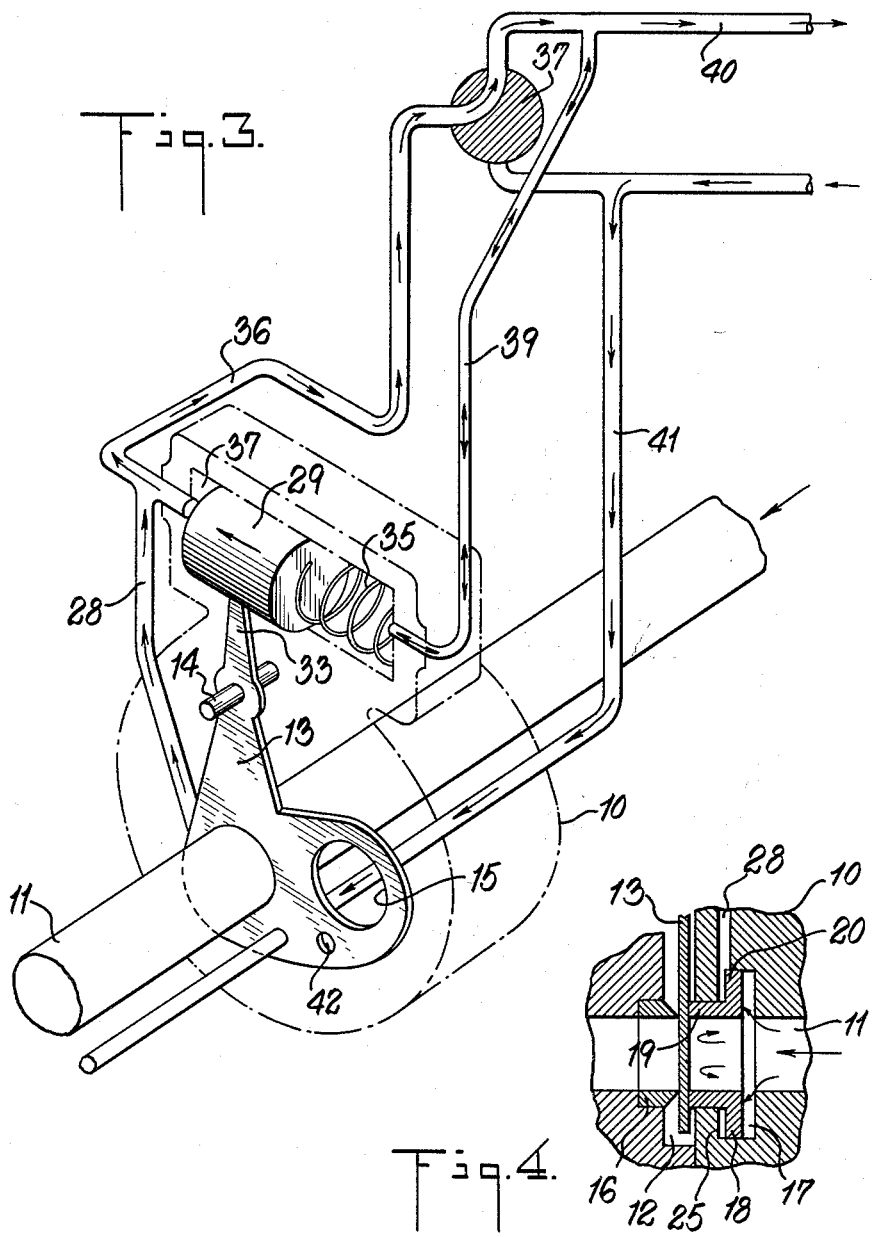

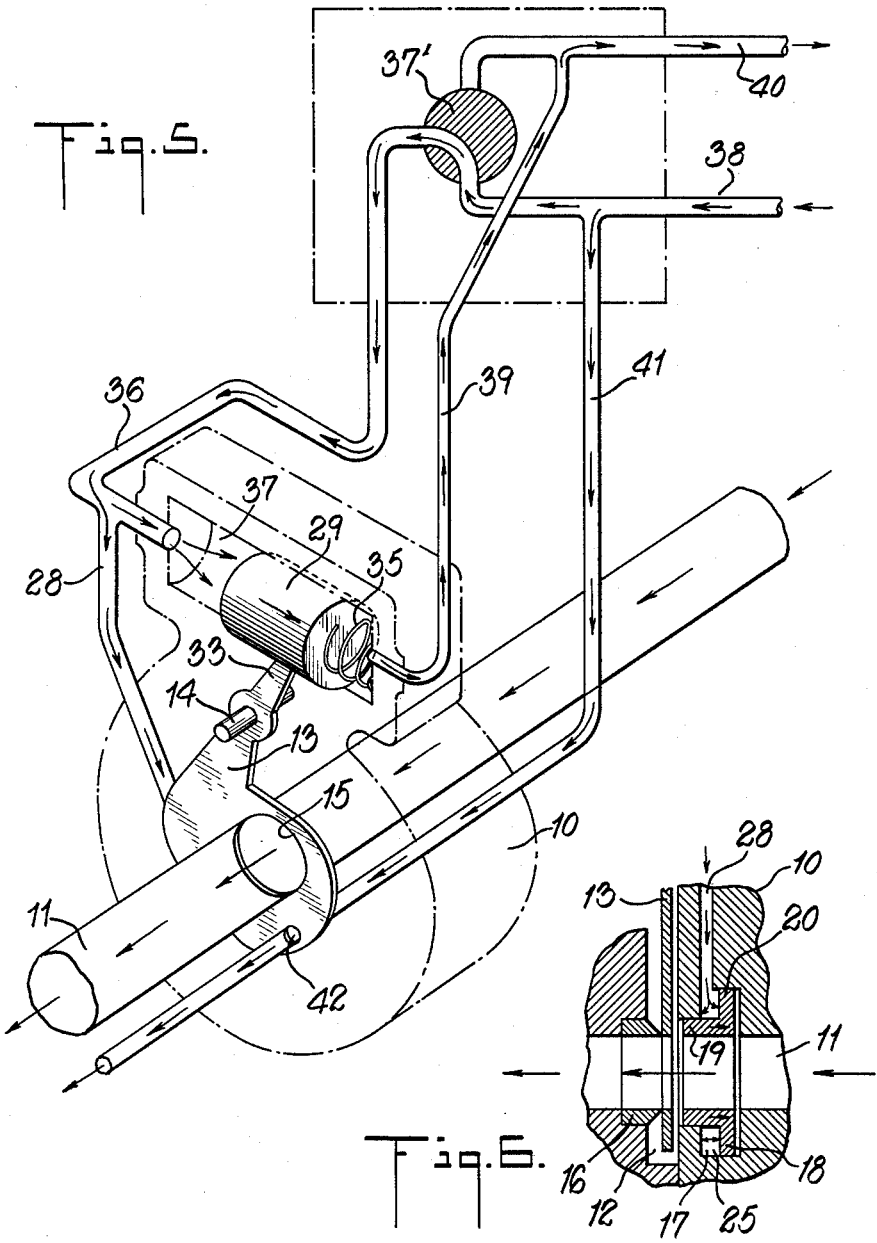

3,109,457
GATE VALVE
John V. Oliveau, Greenwich, Conn., assignor, by mesne assignments, to Aerotec Industries, Inc., Greenwich, Conn., a corporation of Connecticut
Filed Sept. 25, 1959, Ser. No. 842,338
10 Claims. (Cl. 137—625.18)

My present invention relates to a gate valve, that is, a valve of the type in which fluids under pressure are delivered through a passageway in the valve which may be interrupted or closed by sliding a shutter across the passageway.

When such a valve is used for the transmission of fluids under high pressures it is necessary in order to avoid leakage that the passageway be tightly sealed against the shutter when the latter is closed. However, this tight sealing of the passage imposes a pressure on the shutter which makes it difficult to slide it out of the passageway in order to open the passage. To create a tightness or pressure of a sealing material against the shutter might prevent or delay its opening when such opening is accomplished by means of a resilient element such as a spring.

My present invention avoids this difficulty of resistance to opening while at the same time providing a tight seal to avoid leakage when the valve is in closed position.

In my invention I provide a housing having a fluid passage therethrough which is intersected by a chamber for the shutter in which the shutter is slidable to opened position to permit the passage of fluid and to closed position to interrupt passage of the fluid.

Through my invention a sealing ring is provided which in the closed position of the shutter presses against the shutter and presses the shutter against a valve seat, this pressure being produced by and proportional to the pressure of the fluid being supplied. When the valve is to be opened the pressure of the fluid on the sealing ring is balanced to a greater or less extent, or may be overcome by the admission of fluid in a direction contrary to the fluid which presses this sealing ring against the shutter.

The various features of my invention are illustrated in the accompanying drawings in which FIG. 1 is a cross-section of the valve taken transverse of the fluid passage and through the shutter chamber;

FIG. 3 is a diagrammatic perspective view of the valve and of an operating mechanism and fluid supply conduits for operating the same to move the shutter to opened or closed position, the shutter being shown in closed position;

FIG. 4 is a detailed section longitudinally of the passage with the shutter in closed position and showing the direction of force on the sealing element;

FIG. 5 is a diagrammatic perspective view similar to that of FIG. 3 but showing the shutter in open position;

FIG. 6 is a section corresponding to that of FIG. 4 showing the pressures on the sealing element with the valve in open position.

Figure 1:
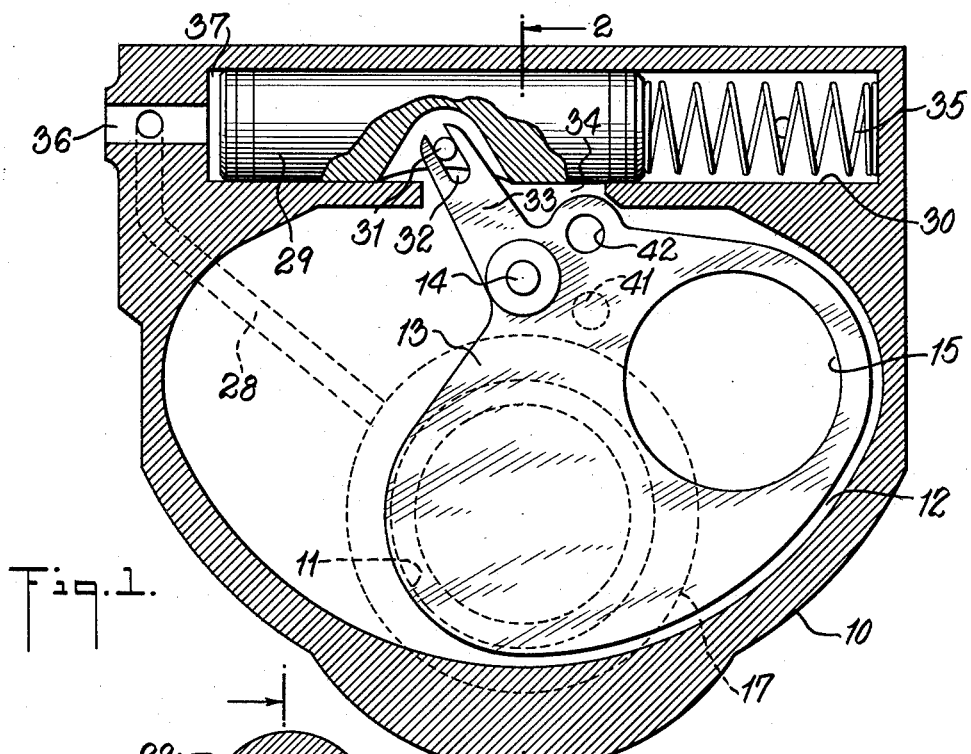

In the embodiment of the invention shown in the drawings, a housing 10 is provided with a fluid passage 11. Intersecting this fluid passage is a shutter chamber 12. As shown particularly in FIG. 1, this shutter chamber extends on opposite sides of the fluid passage 11. A shutter 13 is pivoted on a pintle or shaft 14 extending transversely of the shutter chamber and set into the wall of the housing. This permits the shutter to be swung from the closed position shown in FIGS. 1 and 3 to the open position shown in FIG. 5.

The shutter is provided with an opening 15 which is aligned with the passageway, as indicated in FIG. 5, when the shutter is in open position. The shutter is, however, of sufficient width that when it is moved to the position shown in FIGS. 1 and 3 it will span and close the passage 11.

Figure 2:
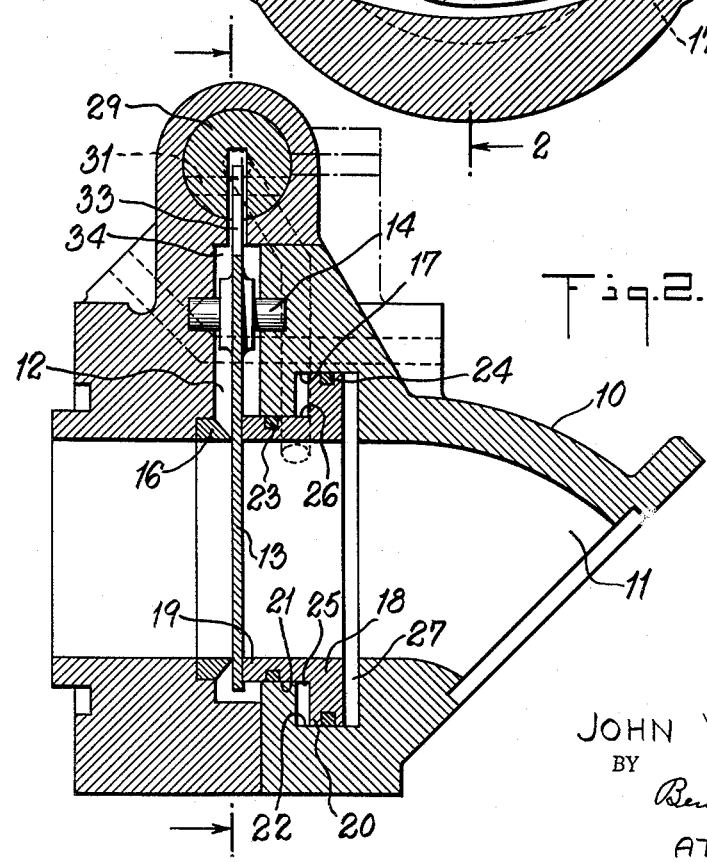
FIG. 2 is a section on the line 2—2 of FIG. 1, that is, longitudinally of the fluid passage and with the shutter shown in closed position.

At the exit or outlet side of the shutter chamber 12 there is provided an annular valve seat 16 having a knife edge aligned with the inner surface of the passage 11. When the valve is closed as shown in FIG. 2 pressure applied to the right-hand side of the valve 13 presses it tightly against this knife edge. On the opposite side of the valve there is provided a sealing recess 17 for a sliding seal 18. The seal 18 has an inner periphery approximately and preferably coinciding with the inner surface of the passage 11. And it also has a sealing portion 19 of smaller outer diameter and a piston portion 20 of larger outside diameter. Complementary to this stepped sealing element the recess 17 has a smaller diameter 21 in which the smaller diameter portion of the seal 18 is slidable fluidtightly, and a larger diameter portion 22 in which the piston portion 18 of the seal is slidable fluidtightly. The smaller and larger diameter portions may be rendered fluidtight by means of resilient gaskets 23 and 24. The length of the smaller diameter part of the sealing element 18 is of sufficient length that when it is tightly against the shutter 13 a small space 25 is provided between the seal 18 and a stepped shoulder 26 of the recess, as shown in FIGS. 2 and 4. The recess is of such width that in this position there is also provided a space 27 on the opposite side of the piston element of the seal. When the seal is withdrawn from the shutter 13 preparatory to opening the latter the space 25 is increased but a small space 27 is still left with the seal in this position.

From the above it will be apparent that pressure admitted to the passage 11 on the sealing side of the shutter 13 will enter the space 27 and press the sealing ring to the left against the shutter 13 with a force which is equal to the annular area of the seal within the recess times the pressure of the fluid. This also presses the shutter 13 tightly against the valve seat 16.

Before opening the valve fluid, preferably under a pressure considerably above that of the fluid in the passage 11, is admitted to the space 25 which may overcome the pressure in the space 27 and thus balance the pressure in the latter space, or may move the seal to the right, that is, to the position shown in FIG. 6. This relieves the frictional resistance of the sealing element on the shutter 13 and thus removes its resistance to movement to open position. Pressure is admitted to the chamber 25 through a conduit or passage 28. This pressure may be introduced from any suitable source and its admission may be controlled in cooperation with the mechanism for swinging the shutter from closed to open position.

In the embodiment shown in the drawings the shutter 13 is moved by fluid pressure, such as by hydraulic pressure, from closed to open position. For this purpose the moving element comprises a piston 29 slidable in a cylindrical passage 30 in the housing 10 and having a cross pin 31 engaging a slot 32 in a stem 33 of the shutter 13 which projects upwardly through an opening 34 in the cylindrical passage 30. Normally the shutter is pressed by a spring 35 confined between the end of the piston 29 and the end of the cylindrical passage 30, as shown in FIG. 1. Inasmuch as this closing takes place while the seal is withdrawn and not under the full pressure of the fluid admitted to the passage 11, such closing may be accomplished by the spring. To open the shutter pressure is admitted to the end of the cylindrical passage 30 through a pipe 36 from which the conduit 28 branches. It will, therefore, be apparent that when pressure is admitted through the pipe 36 to a space 37 at the left-hand end of the piston 29, it is also admitted to the space 25 and releases the sealing portion. This releasing of the sealing portion 19 at the admission of the fluid to the space 37 immediately releases the pressure of the seal 18 on the shutter 13 so that the shutter may be readily moved to open position. The pressure of the fluid admitted through the pipe 36 will be much higher than that of the fluid admitted to the passage 11. For example it may have a pressure per square inch 150 pounds above that of the fluid supplied to the passage 11. Pressure fluid may be admitted to the space 36 and withdrawn therefrom through any suitable means. As shown diagrammatically in FIGS. 3 and 5 it may be admitted and exhausted by means of a rotary valve 37' which in the position shown in FIG. 5 admits the high pressure fluid from a supply conduit 38 through the valve to the pipe 36 while at the same time any fluid at the right of the piston 29 is exhausted through the exhaust pipe 39 to a conduit or pipe 40 leading to a sump or reservoir. When the valve is turned to the position shown in FIG. 3, high pressure fluid is exhausted from the conduit 36 through the valve 37' to the pipe 40 which remains connected to the opposite side of the piston through the conduit 39, thus equalizing the pressure therein, and the spring 35 then presses the shutter to open position.

There is shown incidentally in FIGS. 3 and 5 a conduit 41 leading from the high pressure pipe 38 through a passage in the housing in such position that it may be opened and closed through an opening 42 in the shutter 13 when the latter is open to a certain distance, for example, when opened 60%. This opening 42 is so positioned that it will not be in the path of the main opening 15 in the shutter.

Through the above a valve mechanism has been provided which very effectively seals the valve when closed but releases any sealing resistance on the valve prior to and during its opening movement.

Having described my invention, what I claim is:

1. A gate valve comprising a housing having a fluid passage, a shutter chamber intersecting said passage, a valve seat about said passage at one side of said chamber and an annular sealing recess about said passage extending from the opposite side of said shutter chamber, said sealing recess being stepped to two diameters, the smaller diameter portion opening to said chamber and the larger diameter portion being spaced from said shutter chamber; a shutter slidable in said shutter chamber alternatively to shut and to open said passage; and a sliding seal in said sealing recess extending through said smaller diameter recess portion and slidable fluidtightly therein toward and from said shutter and having a piston portion sliding in the larger diameter recess portion and with one face thereof exposed to the pressure of said fluid passage; said housing having a fluid conduit to a second face of said piston portion opposite said one face to effect biasing effort which urges said sliding seal away from engagement with the shutter to provide freer slideable movement thereof within the shutter chamber between open and shut positions for said fluid passage.

2. The gate valve of claim 1 in which said shutter is pivoted in said shutter chamber.

3. The gate valve of claim 1 having a shutter operating piston operable by fluid to move said shutter to open position and a fluid supply system to said piston to move said shutter to open position and to said conduit in said valve housing.

4. The gate valve of claim 3 having a valve to admit fluid to and exhaust fluid from said fluid supply system.

5. The gate valve of claim 4 having resilient means to return said piston to position to move said shutter to closed position.

6. The gate valve of claim 4 in which said housing has a second passage and said shutter has an opening to open said second passage.

7. The gate valve of claim 4 in which said housing comprises a cylinder enclosing said piston and in which said piston has a recess and said shutter has a projection fitting into said recess whereby said shutter is coupled directly to said piston for movement thereby.

8. A gate valve comprising a fluid passage means, a shutter disposed transversely of said passage means and slideable transversely of said passage to control fluid movement therethrough, a sealing member providing a sealing surface against which said shutter is urged to effect a fluid seal blocking passage of fluid through said passage, fluid pressure responsive means disposed within said passage and having a piston area responsive to the fluid pressure within the passage to effect biasing effort on the shutter through an operative connection therewith and thereby producing sealing engagement between said shutter and its opposed sealing member, and means forming a chamber wherein said fluid pressure responsive means has a movable wall, and means for communicating fluid under pressure to said chamber to effect movement of said piston away from its engagement with said shutter thereby relieving the sealing pressure between said shutter and its opposed sealing member and facilitating slideable movement of the shutter between its open and closed positions.

9. The shutter structure in accordance with claim 8 including a shutter-operating fluid pressure responsive member having a force transmitting connection with said shutter to effect angular movement thereof between open and closed positions.

10. A gate valve comprising a casing having a fluid passage, a shutter disposed transversely of said passage, means to support said shutter pivotally on an axis outside said passage to slide transversely of said passage thereby to control fluid movement therethrough, a fluid pressure responsive member, means connecting said member with said shutter to effect angular movement thereof between open and closed positions, a sealing member providing a sealing surface against which said shutter is urged to effect a fluid seal blocking passage of fluid through said passage, fluid pressure responsive means disposed within said passage and having a piston area responsive to the fluid pressure within said passage and positioned to effect biasing effort on said shutter and thereby to produce sealing engagement between said shutter and its opposed sealing member, and said casing having a chamber wherein said fluid pressure responsive means has a movable wall extending from said piston toward said shutter and means for communicating fluid under pressure to said chamber to effect movement of said piston away from its engagement with said shutter thereby relieving the sealing pressure between said shutter and its opposed sealing member and facilitating slideable movement of the shutter between its open and closed positions, fluid conducting means connected in common both to said chamber and to said shutter-operating fluid pressure responsive member to effect simultaneously a relief of normal sealing pressure between said shutter and its opposed sealing member and angular movement thereof from a passage-closing position to a passage-opening position.

References Cited in the file of this patent

UNITED STATES PATENTS

| | | |
|---|---|---|
| 607,265 | McLean | July 12, 1898 |
| 783,953 | Henry | Feb. 28, 1905 |
| 1,517,728 | Heath | Dec. 2, 1924 |
| 2,356,630 | Strecker | Aug. 22, 1944 |
| 2,654,924 | Wood et al. | Oct. 13, 1953 |
| 2,714,882 | Brevard | Aug. 9, 1955 |
| 2,792,020 | Lieser | May 14, 1957 |
| 2,858,851 | Holl | Nov. 4, 1958 |

FOREIGN PATENTS

| | | |
|---|---|---|
| 530,687 | Germany | July 31, 1931 |